United States Patent
Shane et al.

(10) Patent No.: US 10,159,189 B2
(45) Date of Patent: Dec. 25, 2018

(54) STALK CONDITIONER FOR A HEADER OF AN AGRICULTURAL COMBINE

(71) Applicant: CNH Industrial America LLC, New Holland, PA (US)

(72) Inventors: Nicholas Shane, Bennett, IA (US); Eric Fredricks, Davenport, IA (US); Clay Reinecke, Blue Grass, IA (US); Todd Stegmiller, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 102 days.

(21) Appl. No.: 15/236,080

(22) Filed: Aug. 12, 2016

(65) Prior Publication Data

US 2018/0042180 A1 Feb. 15, 2018

(51) Int. Cl.
| | |
|---|---|
| A01D 82/00 | (2006.01) |
| A01D 41/06 | (2006.01) |
| A01D 34/44 | (2006.01) |
| A01D 101/00 | (2006.01) |

(52) U.S. Cl.
CPC ............. *A01D 82/00* (2013.01); *A01D 34/44* (2013.01); *A01D 41/06* (2013.01); *A01D 2101/00* (2013.01)

(58) Field of Classification Search
CPC .. A01D 34/8355; A01D 45/021; A01D 41/14; A01D 45/02; A01D 47/00; A01D 82/00; A01D 45/025; A01B 29/04
USPC .................................................. 56/52, DIG. 1
See application file for complete search history.

(56) References Cited

U.S. PATENT DOCUMENTS

| | | | |
|---|---|---|---|
| 1,047,979 A | 12/1912 | Osborne | |
| 3,611,681 A * | 10/1971 | Blanton et al. | A01D 41/14 56/10.4 |
| 3,982,384 A * | 9/1976 | Rohweder | A01D 45/021 56/106 |
| 4,884,391 A | 12/1989 | Cosson | |
| 5,103,624 A * | 4/1992 | Marshall | A01D 34/435 172/176 |
| 7,874,135 B2 | 1/2011 | Nagy et al. | |
| 8,171,707 B2 | 5/2012 | Kitchel | |
| 8,745,963 B1 * | 6/2014 | Shoup | A01B 35/20 56/10.2 E |

(Continued)

FOREIGN PATENT DOCUMENTS

| | | | |
|---|---|---|---|
| CA | 2695899 A1 | 9/2011 | |
| DE | 102013004438 B3 * | 3/2014 | A01D 34/8355 |

(Continued)

*Primary Examiner* — Arpad Fabian-Kovacs
(74) *Attorney, Agent, or Firm* — Patrick M. Sheldrake; Peter K. Zacharias

(57) ABSTRACT

A header for a combine harvester, the header including a frame mountable to a forward end of the combine harvester, at least one row unit mounted to the frame to receive and process stalks of corn, a stomping shoe mounted to the frame behind the row unit to flatten stalks of corn, and a stalk splitter mounted to frame behind the row unit to split stalks of corn. The face of the stomping shoe is provided with a plurality of structures to guide each stalk of corn along a predefined path on the face while the stalks of corn are flattened. The stalk splitter includes a disk blade biased against the ground for splitting stalks of corn after they are processed by row units of the corn header.

19 Claims, 15 Drawing Sheets

(56) References Cited

U.S. PATENT DOCUMENTS

| | | | |
|---|---|---|---|
| 8,875,481 B2 | 11/2014 | Roberg | |
| 9,730,374 B2* | 8/2017 | Wick | A01B 39/22 |
| 9,743,587 B2* | 8/2017 | Lohrentz | A01D 45/021 |
| 9,861,036 B2* | 1/2018 | Totten | A01D 34/74 |
| 2013/0019581 A1* | 1/2013 | Hyronimus | A01D 63/00 |
| | | | 56/314 |
| 2013/0020100 A1* | 1/2013 | Shoup | A01B 61/046 |
| | | | 172/762 |
| 2013/0020101 A1* | 1/2013 | Shoup | A01B 39/22 |
| | | | 172/763 |
| 2013/0061569 A1* | 3/2013 | McClenathen | A01D 34/8355 |
| | | | 56/52 |
| 2013/0174529 A1* | 7/2013 | Hyronimus | A01D 75/00 |
| | | | 56/314 |
| 2013/0177348 A1* | 7/2013 | Hyronimus | A01D 75/00 |
| | | | 403/164 |
| 2014/0151073 A1* | 6/2014 | Taylor | A01D 34/8355 |
| | | | 172/1 |
| 2014/0319253 A1 | 10/2014 | Nurnberg et al. | |
| 2015/0216104 A1* | 8/2015 | Bassett | A01B 49/027 |
| | | | 172/151 |
| 2016/0066504 A1 | 3/2016 | Holman | |
| 2016/0183468 A1 | 6/2016 | Lohrentz et al. | |
| 2017/0231145 A1* | 8/2017 | Bassett | A01B 49/04 |
| | | | 172/27 |

FOREIGN PATENT DOCUMENTS

| | | | | |
|---|---|---|---|---|
| WO | 2014139496 A1 | | 9/2014 | |
| WO | WO-2016109714 A1 * | | 7/2016 | A01D 34/8355 |

* cited by examiner

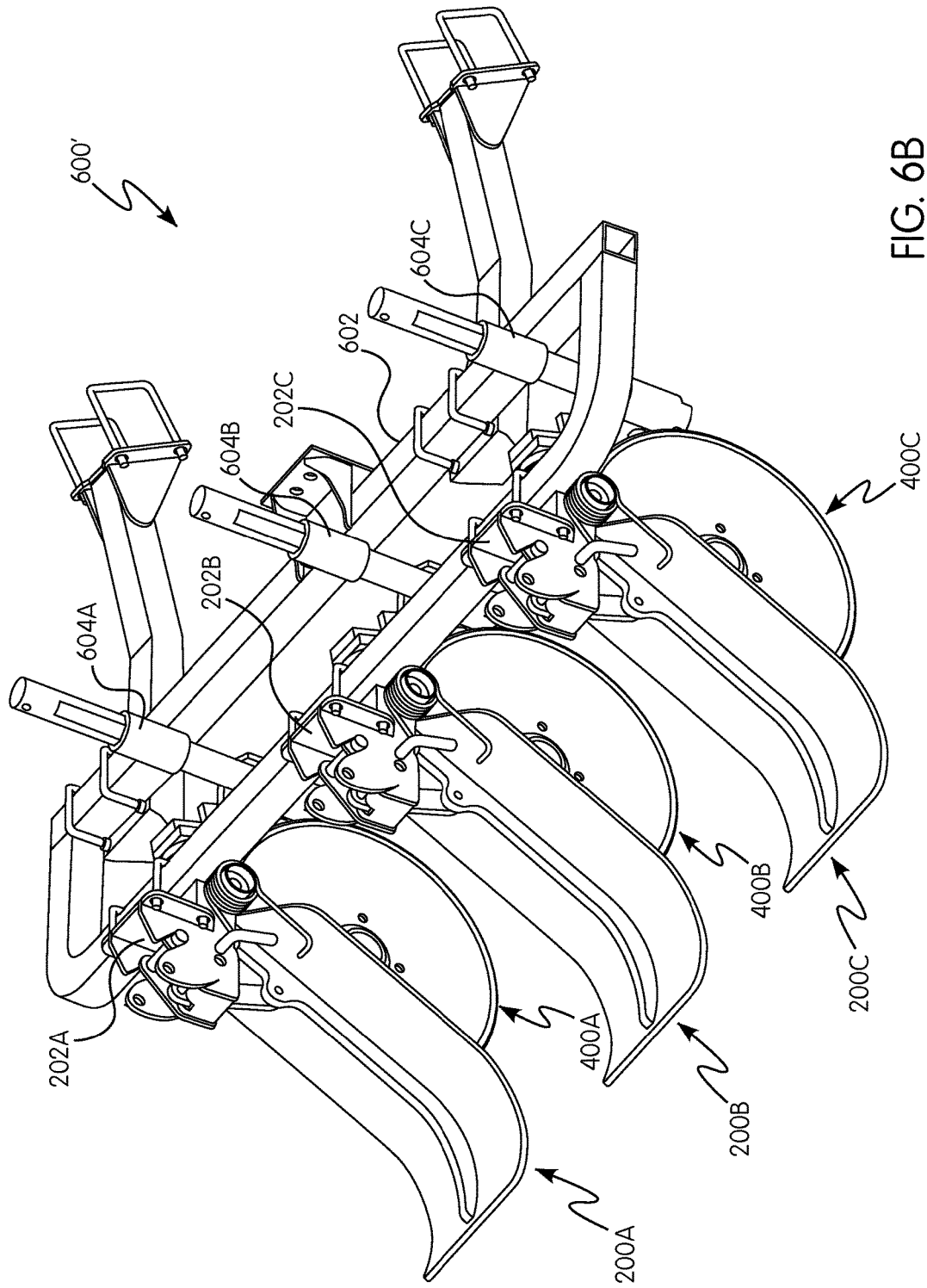

STALK CONDITIONER FOR A HEADER OF AN AGRICULTURAL COMBINE

FIELD OF THE INVENTION

The present invention relates generally to a stalk conditioner e.g., stalk splitters and stomping shoes for use with agricultural harvesters.

BACKGROUND OF THE INVENTION

Agricultural harvesters, such as combine harvesters, provide for efficient harvesting of crops such as corn. When configured for corn harvesting an agricultural harvester generally includes a corn header that separates crop material (i.e., ears of corn) from corn stalks. The removed ears of corn are fed into a separator that separates the grains of corn from all other materials other than grain ("MOG"). A typical corn header includes several row units, one for each row being harvested in a single pass over a field. As the corn header moves forward, a corn stalk in each row of corn enters the forwardly extending channel defined by the particular row unit associated with that row. Generally, each row unit includes a stripping plate with a gap ("stripping plate gap") that is wide enough to receive the corn stalk, but not wide enough for the ear of corn on the stalk to pass through. As the harvester moves forward, the stripping plates exert a backward and upward force on the ear of corn while the row unit stalk rolls pull the corn stalks downwardly. The ears of corn are then collected by a feeder and processed by the combine harvester in a known fashion.

After a field of corn is processed in this manner, the stripped stalks remain behind in the field. Farmers typically leave the stripped stalks in the field between plantings to assist in controlling erosion of ground soil from wind and rain and to provide a natural fertilizer for subsequent crops after decomposition. However, since the stripped stalks remain standing, they sometimes interfere with the planting of subsequent crops. For this reason, farmers typically employ various methods for knocking down or chopping stripped stalks after harvesting a field of corn.

One method involves the use of tillage, whereby a farmer employs tilling equipment to work the stripped stalks into the ground to aid in decomposition of the stalks and clear the field for subsequent planting. A farmer may also employ "no-till" methods of processing the stripped stalks of corn. Unlike tillage, these methods do not process or work the soil, but rather seek to process only the stalks of corn themselves to clear the ground of obstacles that would otherwise prevent a subsequent crop of corn from being sewn. One no-till method involves the use of motorized stalk "cutters" or "choppers" that are dragged across a field after stalks of corn are harvested. Another method involves the use of large scale mowers to cut the stalks down after a harvest. While these methods are effective at clearing stripped stalks of corn before a subsequent planting, they require working the field a second time, which is very time consuming and labor intensive. These methods typically require extensive amounts of power. These disadvantages increase the cost of corn production and, as such, lead to reduced profit margins for farmers.

Accordingly, there is still a need for a stalk conditioner that can accelerate the breakdown of stripped stalks of corn while addresses the drawbacks of conventional methods and without increasing expense.

BRIEF SUMMARY OF THE INVENTION

In accordance with an exemplary embodiment of the present invention, there is provided a header for a combine harvester that includes a frame mountable to a forward end of the combine harvester, at least one row unit mounted to the frame to receive and process crop stalks, a stomping shoe mounted to the frame behind the row unit to flatten stalks, and a stalk splitter mounted to frame behind the row unit to the split stalks.

In accordance with another exemplary embodiment of the present invention, there is provided a stomping shoe having a face with a plurality of structures. The plurality of structures can include, for example, ridges, recesses, fins, welded beads, and/or welded key stock, to guide each stalk along a predefined path on the face, such as a longitudinal centerline of the face. In an exemplary embodiment, the structures include two opposed rows of chevron-shaped ridges arranged on opposite sides of the longitudinal centerline of the face. These structures may be formed into the face of the shoe directly, or alternatively, be formed on a plastic cover fitted over the shoe.

In accordance with yet another exemplary embodiment of the present invention there is provided a stalk splitter having a support structure mounted to the frame of the header and a vertically oriented disk blade rotationally coupled to the support structure. In an exemplary embodiment, the disk blade is biased along a predefined direction with respect to the frame. In yet another exemplary embodiment, a biasing mechanism e.g., a compression spring, provides the biasing force to the disk blade.

In accordance with an exemplary embodiment of the present invention, there is provided a stalk splitter pivotally mounted to the frame of the corn header. This allows the stalk splitter to follow rows of stalks, such as when rows of stalks change direction.

In accordance with yet another exemplary embodiment of the present invention there is provided a header for use with a combine harvester that includes a frame, a least one row unit, and a stomping shoe. The frame is configured to mount to a forward end of the combine harvester. The at least one row unit is mounted to the frame and configured to receive crop stalks. The stomping shoe is mounted to the frame behind the row unit and configured to flatten a stalk after the stalk is received by the row unit. The stomping shoe including a face having a plurality of structures disposed thereon. Each of the plurality of structures is configured to guide the stalk along a predefined path on the face while the stalk is being flattened.

In accordance with another exemplary embodiment of the present invention there is provided a header assembly for use with a combine harvester comprising a frame, at least one row unit and a splitting mechanism. The frame is configured to mount to a forward end of the combine harvester. The at least one row unit is mounted to the frame and configured to receive a stalk. The splitting mechanism is mounted to the frame behind the row unit. The splitting mechanism is configured to slice the stalk along its longitudinal axis after the stalk is processed by the row unit.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments, which are presently preferred. It should be understood, however, that the invention is not limited to the precise arrangements and instrumentalities shown.

In the drawings:

FIG. 6B is a perspective view of a stalk splitter and stomping shoe assembly for a harvester in accordance with another exemplary embodiment of the present invention.

DETAILED DESCRIPTION OF THE INVENTION

Figure 1:
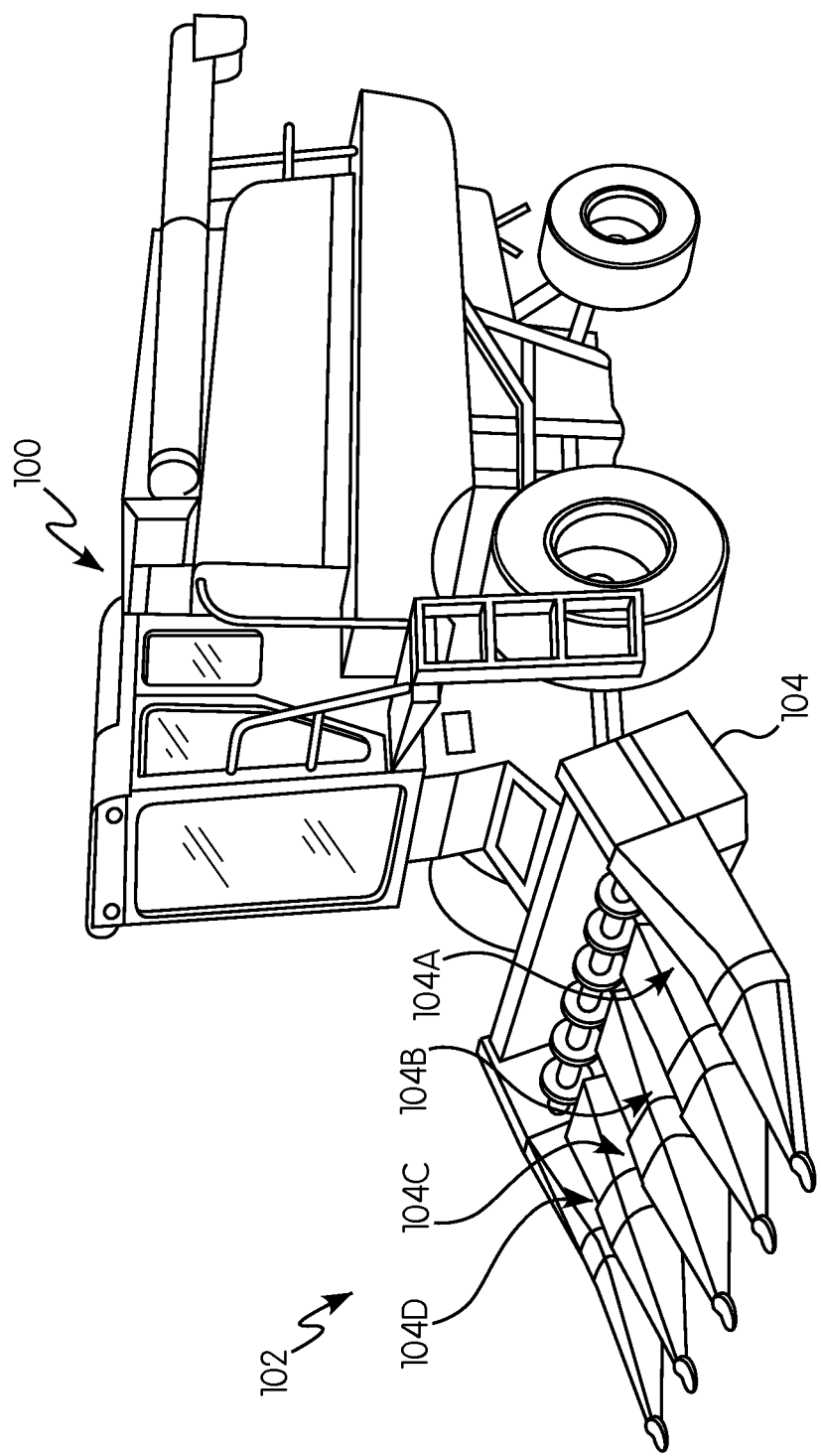
FIG. 1 is a perspective view of a combine harvester in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the embodiments of the present invention may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the present invention.

Figure 1A:
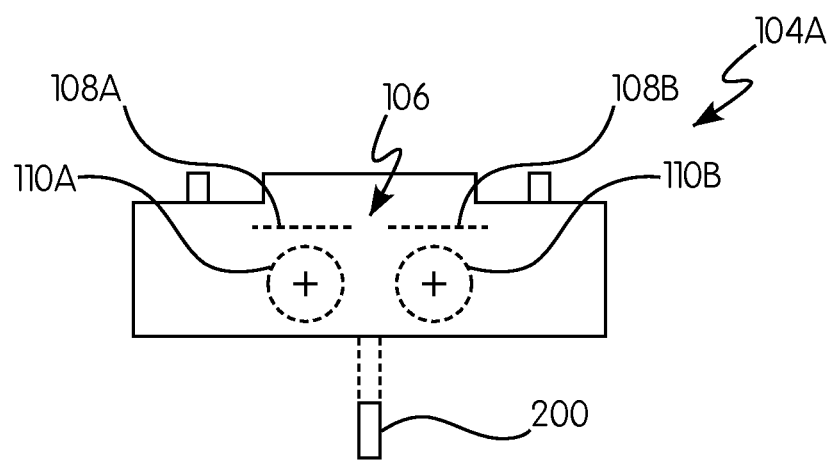
FIG. 1A is a schematic front view of a row unit of the combine harvester of FIG. 1 in accordance with an exemplary embodiment of the present invention.

The header includes a stomping shoe 200 in accordance with an exemplary embodiment of the present invention. Stomping shoe 200 is configured to be positioned on the header to flatten stalks of corn after the stalks are processed by an associated row unit. For this purpose, stomping shoe 200 includes a mounting bracket 202 configured to couple directly to the frame of the corn header such that, when mounted, stomping shoe 200 is positioned inline and behind an associated row unit. In particular, the stomping shoe 200 is configured to be vertically in line with a deck plate gap 106 formed by a pair of deck plates 108A, 108B of the row unit (FIG. 1A). Additionally, the stomping shoe 200 is vertically in line with a gap formed by stalk rolls 110A, 110B of the row unit.

In an alternative exemplary embodiment in accordance with the present invention, mounting bracket 202 is configured to couple to an intermediate frame member which, in turn, is configured to couple to the frame 104 of the corn header. It should be appreciated, however, that various exemplary embodiments of the present invention are not intended to be limited to any specific manner of mounting stomping shoe 200 to a header, and that the full scope of the invention contemplates various additional manners for mounting.

Stomping shoe 200 also includes a cross bar 204 and a stomping ski 206 rotationally coupled to cross bar 204 about a pivot axis 208. A torsional spring 210 is provided for biasing stomping ski 206 angularly about pivot axis 208 with respect to cross bar 204, thereby urging face 212 of stomping ski 206 along direction 214 and into the ground when being used in conjunction with a combine harvester. In other exemplary embodiments, the biasing force is provided by other means, such as, for example, via a compression spring (not shown) positioned to provide an angular compression force between cross bar 204 and stomping ski 206. A limit bar 216 and associated pins 218, 220 limit the angular travel of stomping ski 206 with respect to cross bar 204, thereby preventing undesirable over-travel of stomping ski along direction 214 and ensuring proper orientation of stomping ski with respect to the ground when being used.

Figure 2A:
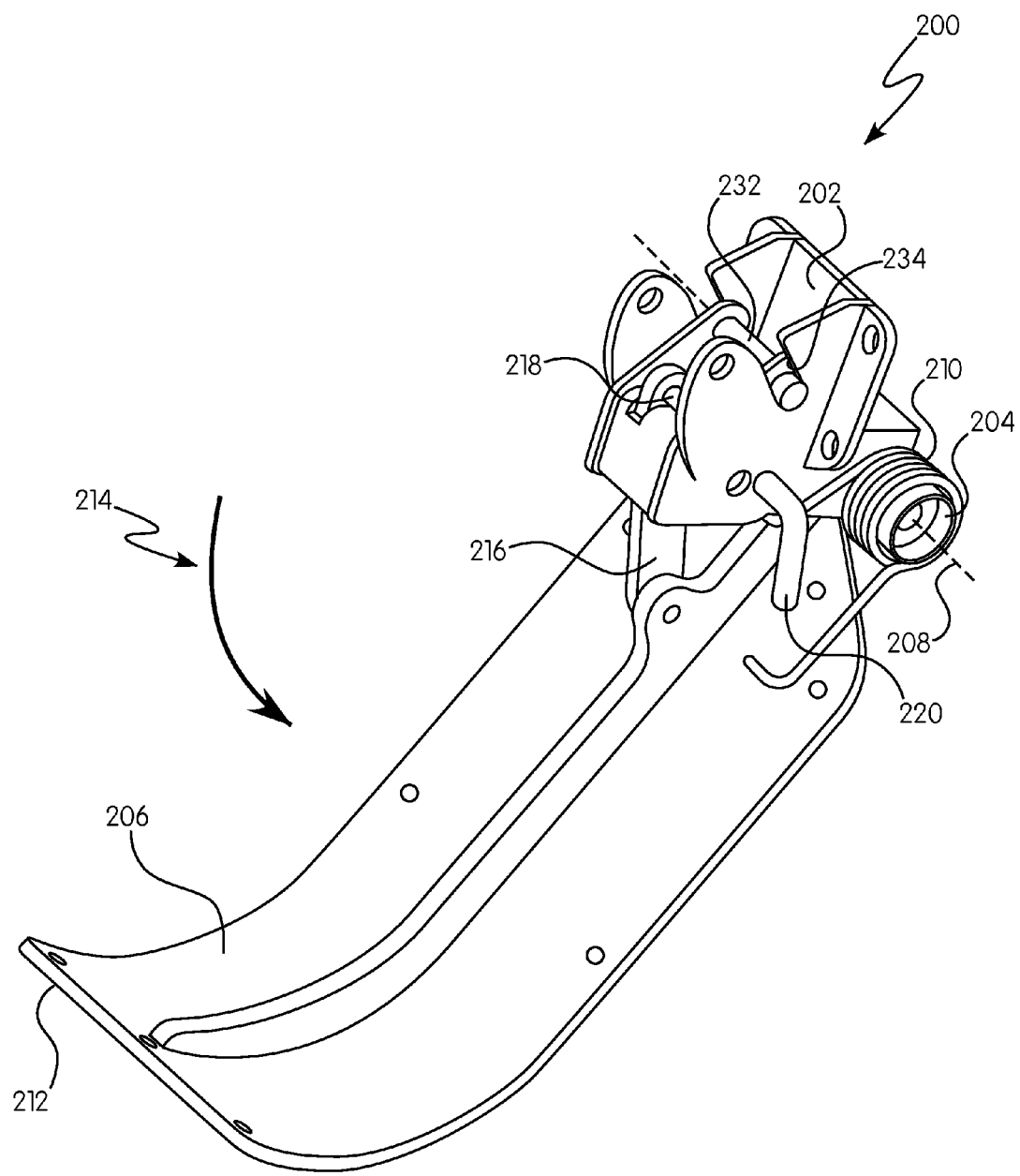
FIG. 2A is a perspective view of a stomping shoe for a harvester in accordance with an exemplary embodiment of the present invention.
Figure 2B:
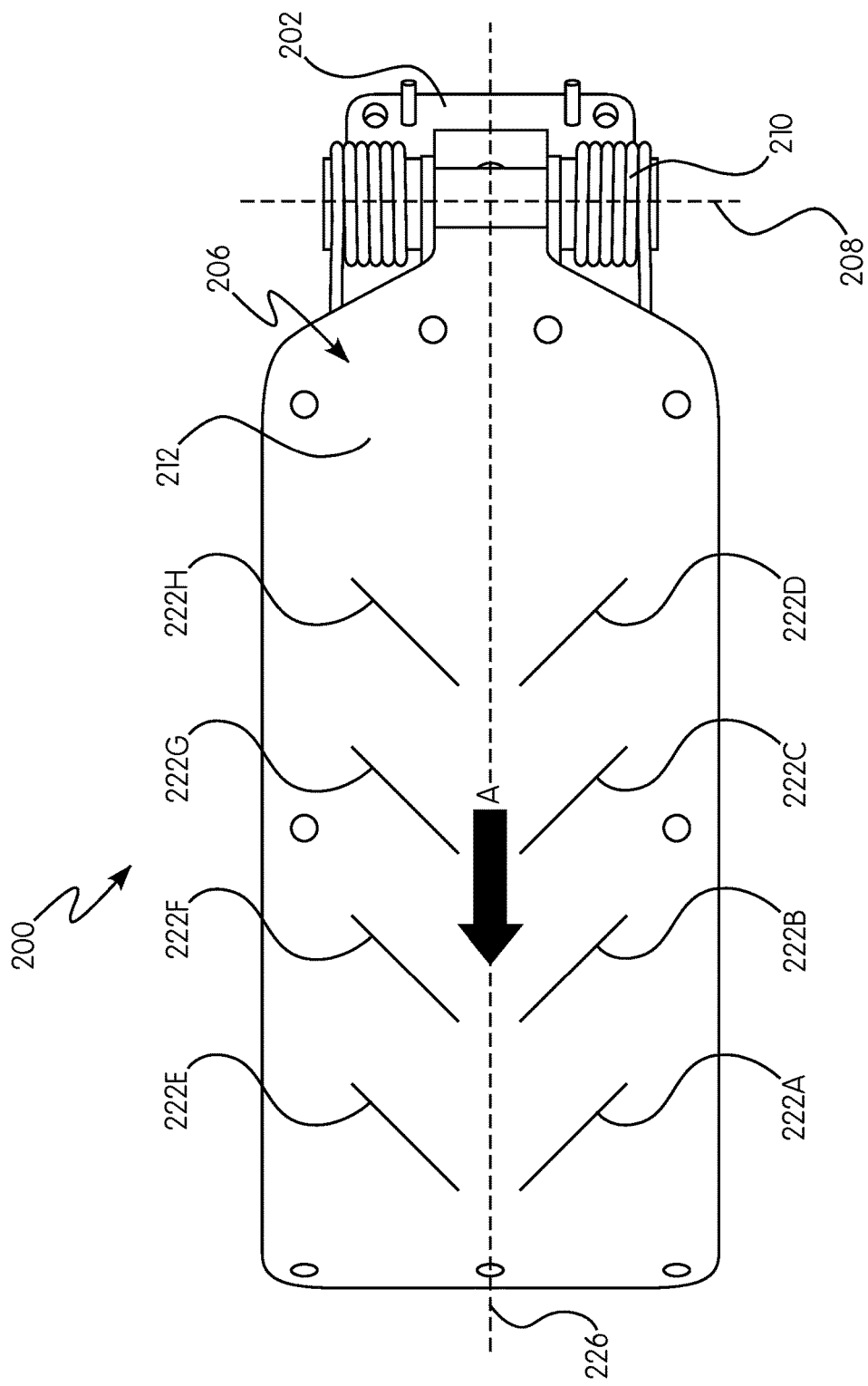
FIG. 2B is a bottom view of the stomping shoe illustrated in FIG. 2A in accordance with an exemplary embodiment of the present invention.
Figure 2C:
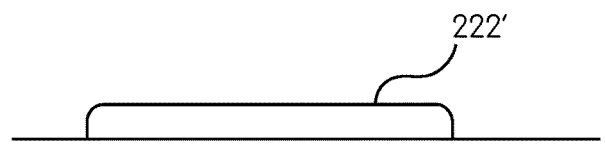
FIGS. 2C-2G illustrate various exemplary embodiments of structures applicable to a stomping shoe for a harvester in accordance with the present invention.
Figure 2D:
Figure 2E:
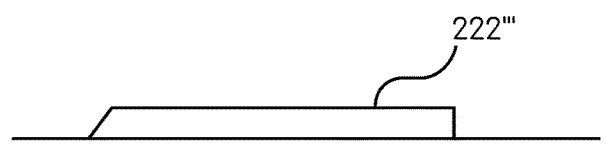
Figure 2F:
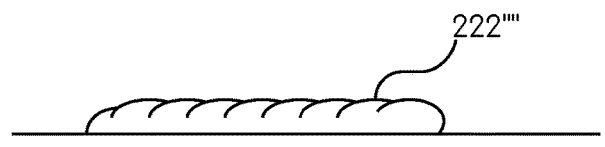
Figure 2G:
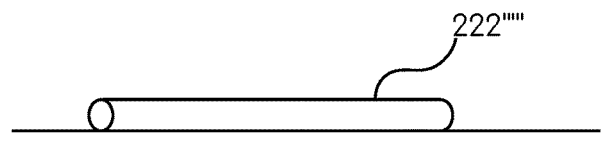

As shown in FIG. 2B, the face 212 of stomping ski 206 includes a plurality of structures 222A-H configured to guide stalks of corn along a predefined path on the face as the stalks are flattened by the stomping ski. The structures can be e.g., ridges 222' (FIG. 2C), recesses 222'' (FIG. 2D), fins 222''' (FIG. 2E), welded beads 222'''' (FIG. 2F), welded key stock 222''''' (FIG. 2G) and the like, or combinations thereof. Structures 222A-H may be formed on or attached to the face 212 of the stomping ski directly.

Figure 2H:
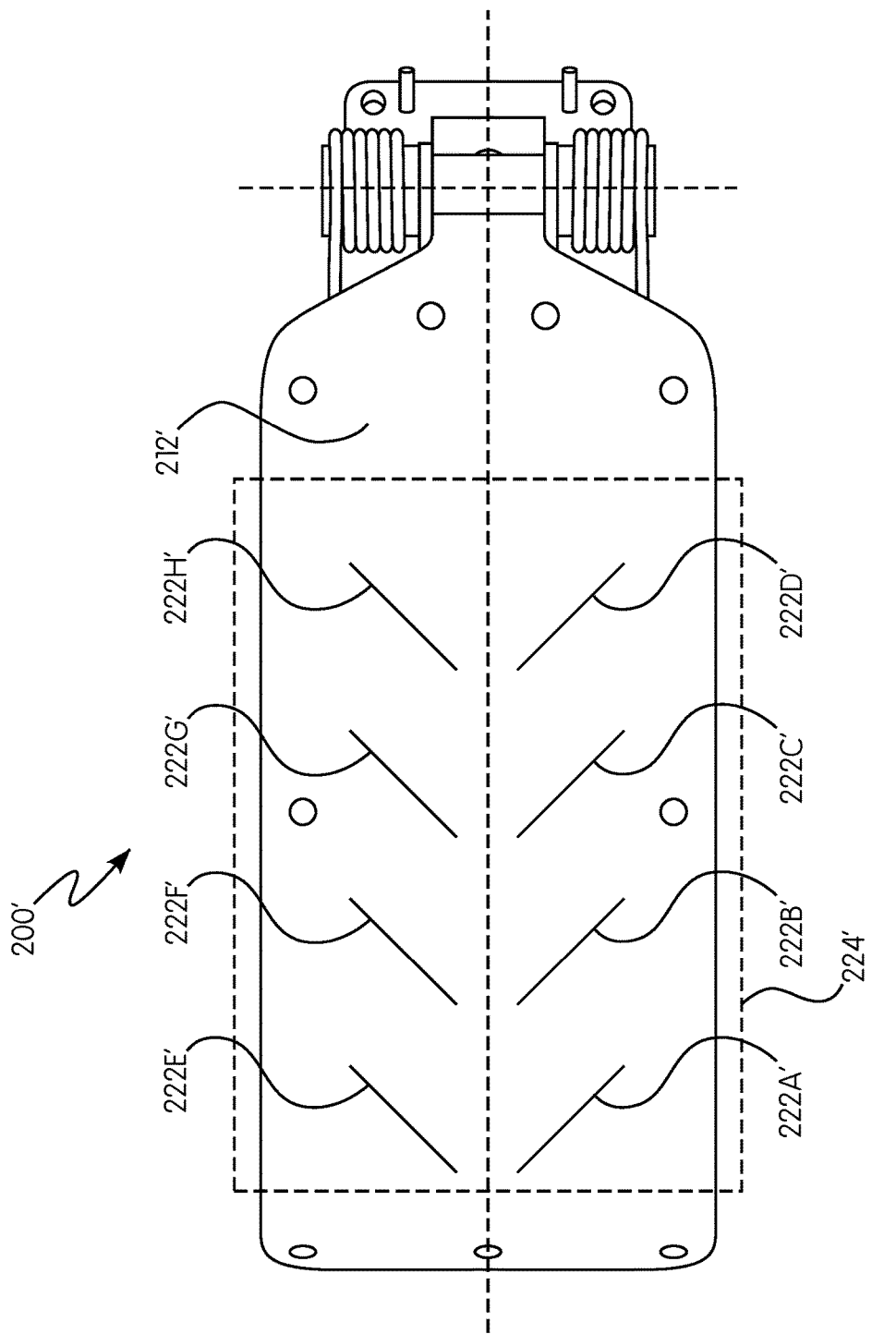
FIG. 2H illustrates a bottom view of a stomping shoe for a harvester in accordance with an exemplary embodiment of the present invention

Alternatively, in accordance with an exemplary embodiment of the present invention the structures can be structures 222A'-H' formed or disposed on a plastic cover 224' (FIG. 2H) fitted onto stomping ski 212' of stomping shoe 200'. That is, the stomping shoe may include a plastic cover, on which a plurality of structures are disposed.

Structures 222A-H ensure that stalks of corn are flattened to the ground in a consistent and defined orientation, which assists subsequent operations such as stalk cutting and/or splitting. In sum, the stomping shoe includes a face for flattening crop stalks, and the face includes a plurality of structures configured to guide each stalk along a predefined path on the face. The predefined path extends along a longitudinal centerline 226 of the face.

In the exemplary embodiments in accordance with the present invention shown in FIGS. 2A and 2B, structures 222A-H are configured as two opposed rows of chevron-shaped ridge structures arranged on opposite sides of the longitudinal centerline 226 of face 212. The chevron-shaped ridge structures form a path or corridor (as illustrated by arrow A) that guides stalks of corn along longitudinal centerline of the face while the stalks are flattened.

Figure 2I:
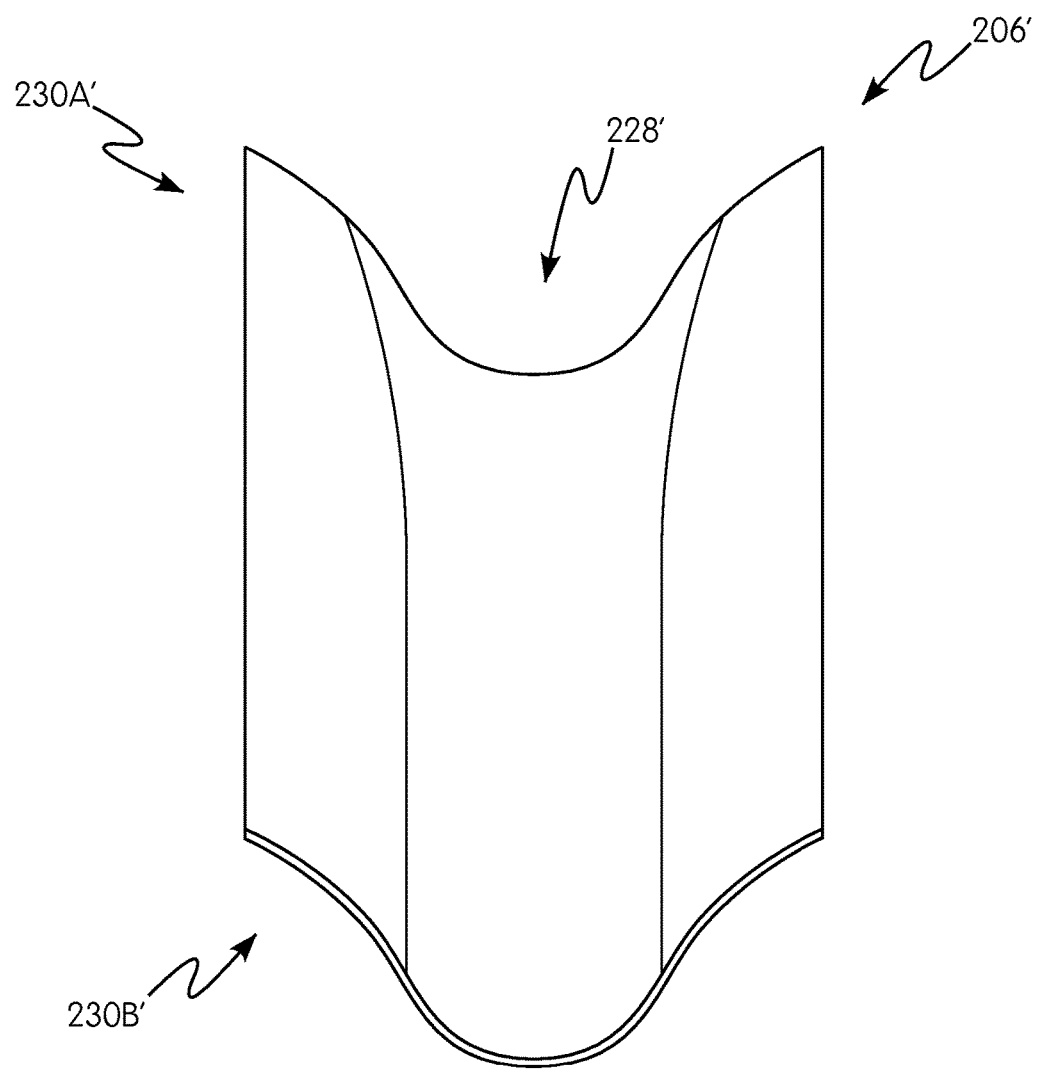
FIG. 2I illustrates a stomping ski applicable to a stomping shoe in accordance with an exemplary embodiment of the present invention.

FIG. 2I illustrates another exemplary embodiment in accordance with the present invention of the stomping ski 206' having a recessed path 228' that extends along a central longitudinal centerline of the stomping ski 206'. Preferably, the recessed path 228' includes a larger proximal end 230A' thereby forming a funnel-like mouth opening for initially receiving stalks therein. Stalks thereafter are oriented and aligned to travel along the recessed path ultimately exiting about it distal end 230'. In other words, the stomping shoe includes an elongated concavity extending along a central longitudinal centerline of the stomping shoe for guiding the stalk along a predefined path defined by the elongated concavity. In other exemplary embodiments in accordance with the present invention, structures or recessed path may be positioned on the stomping ski to guide stalks of corn along other predefined paths on face, for example, along curved and/or off-center paths.

Referring back to FIGS. 2A and 2B, cross bar 204 is configured to releasably attach to mounting bracket 202, for example, to facilitate expeditious replacement and/or maintenance of the stomping ski. For this purpose, cross bar 204 is provided with a locking pin 220 and an engaging bar 232 for engaging receptacle 234 of mounting bracket 202. To detach stomping ski 115 for replacement or maintenance, locking pin 220 is removed, thereby allowing engaging bar 232 to be displaced from engaging receptacle 234 of the mounting bracket.

It should be appreciated, however, that various exemplary embodiments in accordance with the present invention are not intended to be limited to any specific manner of coupling cross bar 204 or stomping ski 212 to mounting bracket 202, and that the full scope of the invention contemplates various additional manners for coupling.

Figure 3:
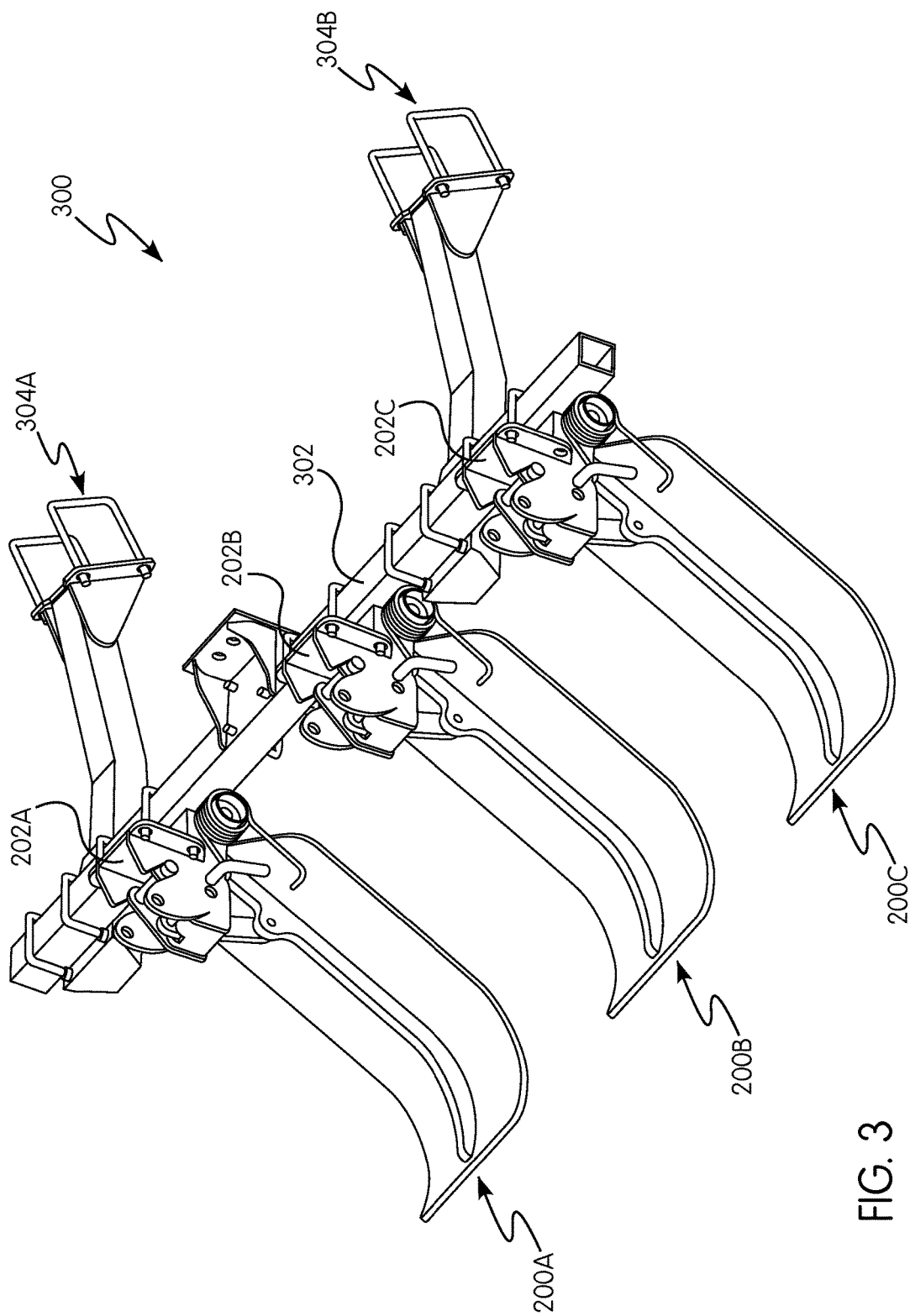
FIG. 3 is a perspective view of a stomping shoe assembly for a harvester in accordance with an exemplary embodiment of the present invention.

Referring now to FIG. 3, there is illustrated a stomping shoe assembly 300 in accordance with an exemplary embodiment of the present invention. Stomping shoe assembly 300 includes a plurality of stomping shoes, e.g., three stomping shoes 200A, 200B, and 200C coupled to intermediate frame member 302 via respective mounting brackets 202A, 202B, and 202C. Intermediate frame member 302 is configured to couple to the frame 104 of a header via mounting points 304A and 304B such that each of stomping shoes 200A, 200B, and 200C is positioned inline and behind an associated row unit for flattening stalks of corn after the stalks are processed by the row units. In an alternative exemplary embodiment in accordance with the present invention, stomping shoes 200A, 200B, and 200C are coupled directly to the frame of a corn header without need for intermediate frame member 302.

As shown in FIG. 3, stomping shoe assembly 300 is intended to be used with a corn header having three row units. However, it should be appreciated that stomping shoe assembly 300 may be sized and configured to include any number of stomping shoes to match corn headers having a commensurate number of row units. For example, stomping shoe assembly 300 may be sized and configured to include eight stomping shoes to accommodate corn headers with eight row units. Alternatively, multiple stomping shoe assemblies 300 may be mounted to a corn header in modular fashion to accommodate a certain number of row units. For example, two modular stomping shoe assemblies, each with three stomping shoes may be mounted to a corn header having six row units.

Figure 4A:
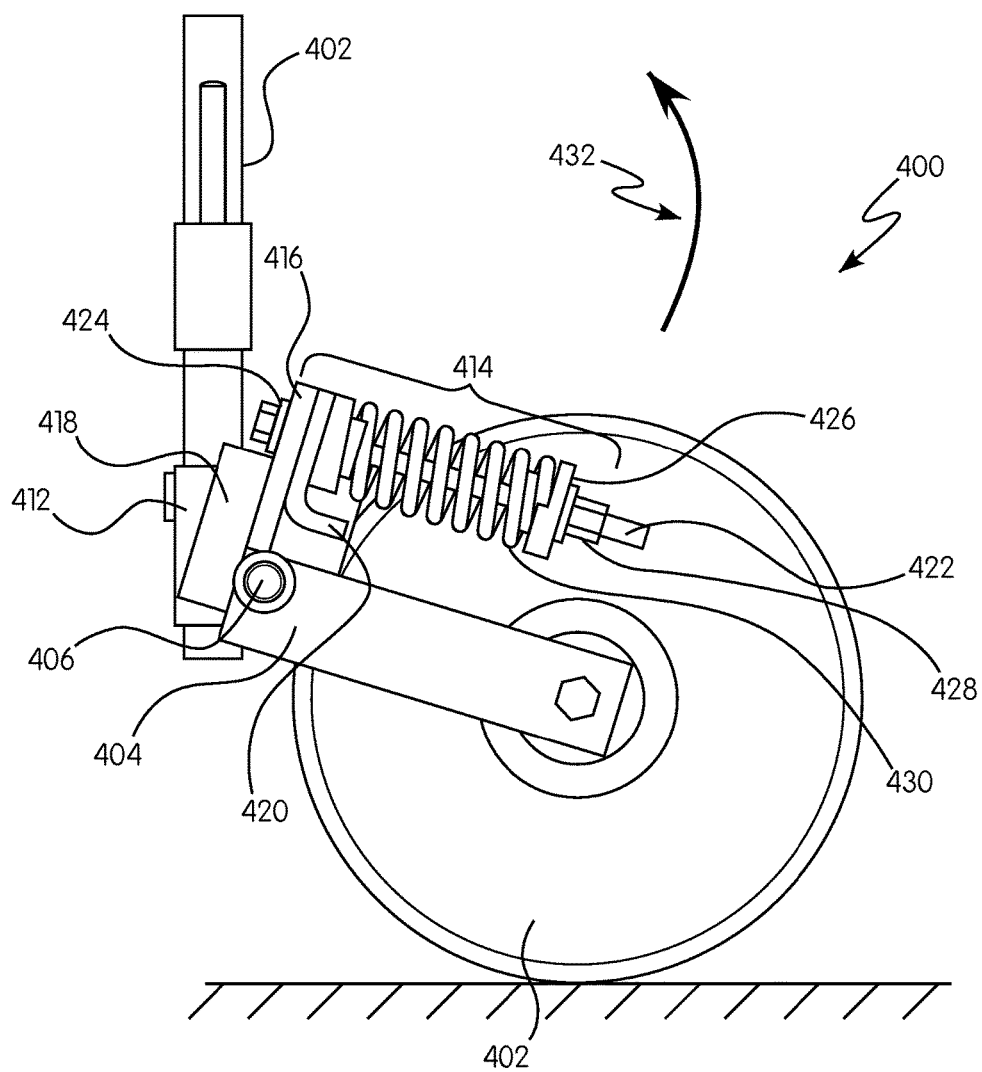
FIG. 4A is a side view of a stalk splitter for a harvester in accordance with an exemplary embodiment of the present invention.
Figure 4B:
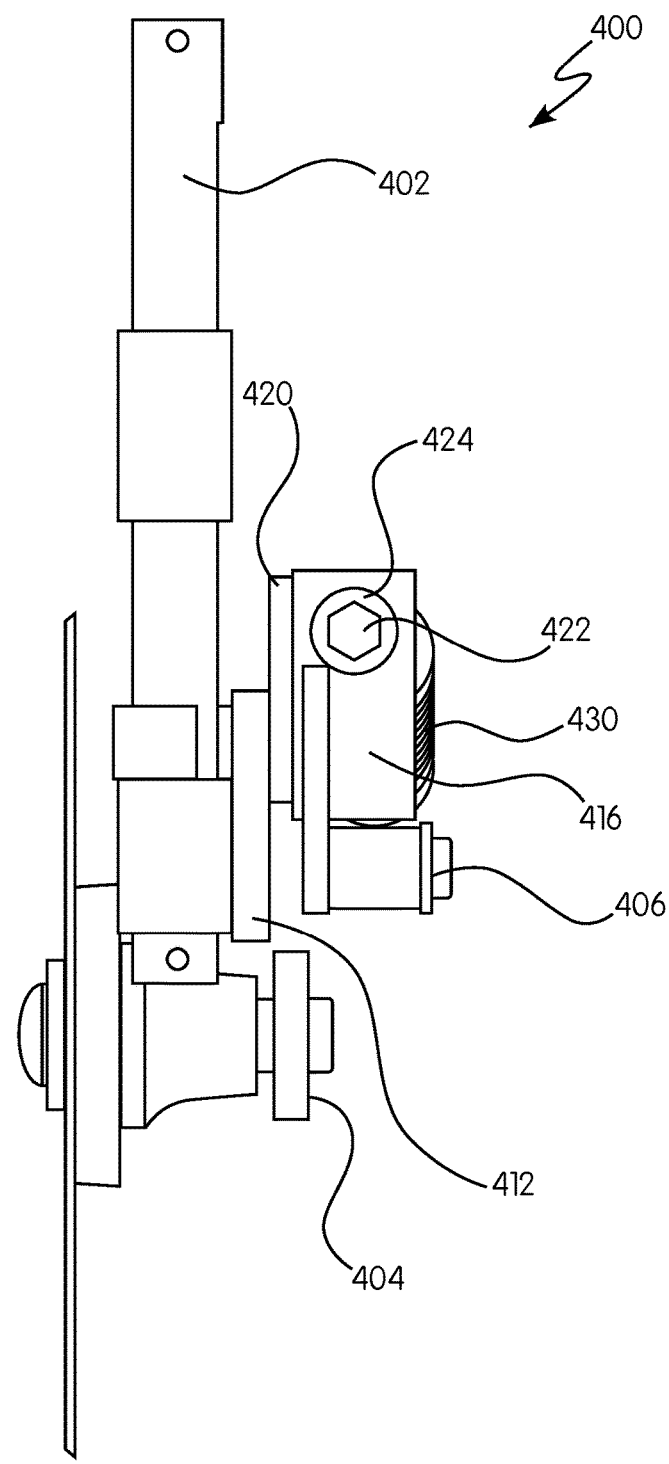
FIG. 4B is a front view of the stalk splitter of FIG. 4A in accordance with an exemplary embodiment of the present invention.

Referring now to FIGS. 4A and 4B, there is shown a stalk splitter 400 in accordance with an exemplary embodiment of the present invention. Stalk splitter 400 is configured to be positioned on a corn header to split stalks of corn after the stalks are processed by an associated row unit. For this purpose, stalk splitter 400 includes a mounting bar 402 configured to couple directly to the frame of the corn header such that, when mounted, stalk splitter 400 is positioned inline and behind the associated row unit. In an alternative exemplary embodiment, mounting bar 402 is configured to couple to an intermediate frame member which, in turn, is configured to couple to the frame of the corn header. It should be appreciated, however, that various exemplary embodiments of the present invention are not intended to be limited to any specific manner of mounting stalk splitter 400 to a header, and that the full scope of the invention contemplates various additional manners for mounting.

Stalk splitter or splitting mechanism 400 includes a disk blade 402 rotationally coupled to a holding arm 404 via pivot 406. Disk blade 402 is operable to roll along the ground behind an associated row unit of a corn header to split stalks of corn after the stalks are processed by the row unit. In other words, the disk blade is operable to slice stalks along their longitudinal axis. Using disk blade 402 to split stalks e.g., corn stalks, not only aids in decomposition of the stalks, but also protects the tires of the combine harvester by weakening the stalks before they are run over. It should also be appreciated that, by using a rolling disk blade 402, no power is required, thereby reducing the expense associated with clearing stripped stalks of corn.

Figure 4C:
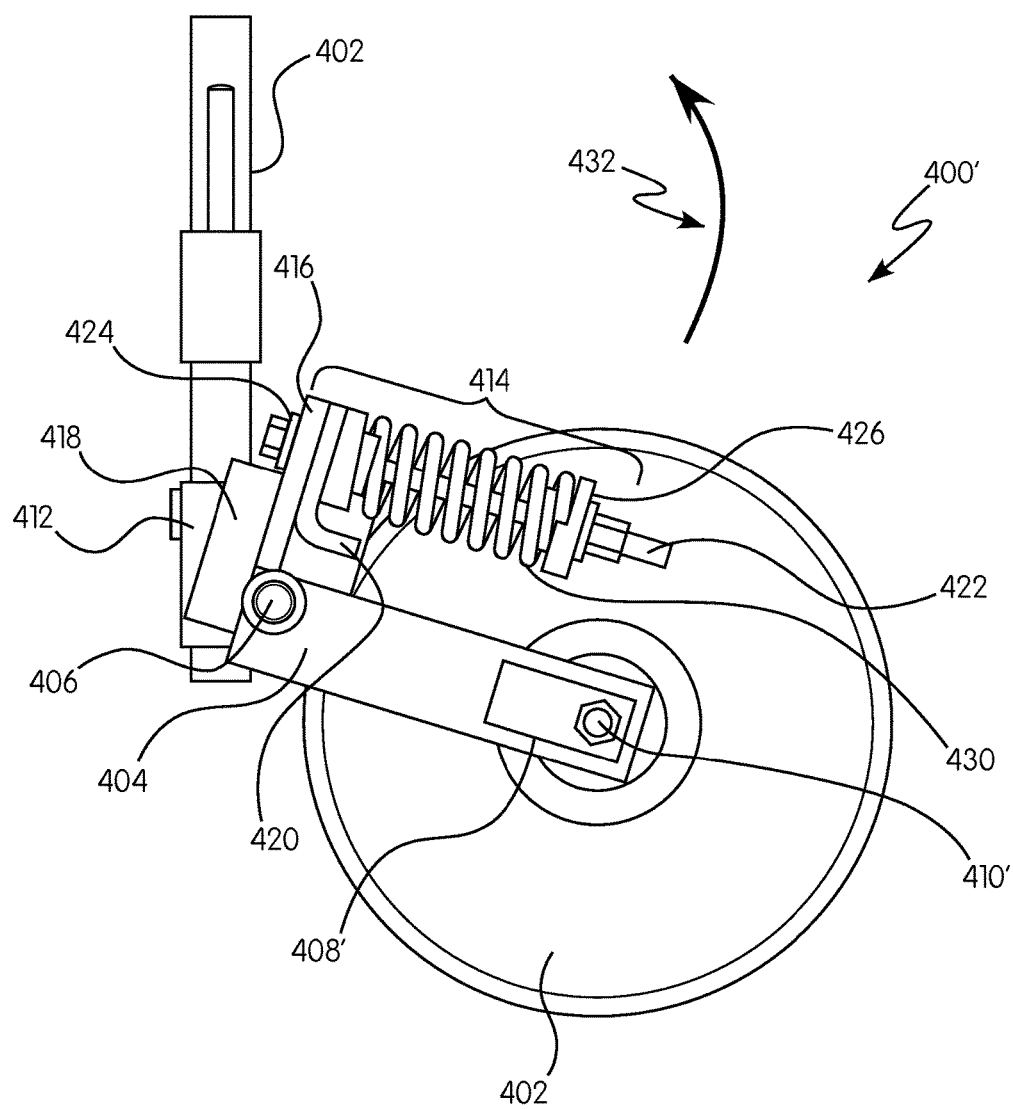
FIG. 4C is a side view of a stalk splitter for a harvester in accordance with another exemplary embodiment of the present invention.

In another exemplary embodiment of the present invention, as shown in FIG. 4C, the disk blade can be powered by a drive mechanism to actively split the stalks of corn. That is, the splitting mechanism 400' can include a drive mechanism 408' to rotate the disk blade. The powered disk blade can be driven by an independent motor 408' operatively attached to the disk blade, or a driven shaft 410', e.g., a shaft operatively connected to a Power Take Off of the combine.

The holding arm 404 is rotationally coupled to a mounting plate 412 via pivot 406 to permit a biasing mechanism 414 to urge disk blade 402 against the ground when in use. Biasing disk blade 402 against the ground allows disk blade to better follow terrain and provides greater cutting force when slicing through the ball root of a stalk of corn or a particularly strong stalk. It also allows disk blade to absorb a portion of the weight of the corn header or feeder and to traverse over difficult obstacles (such as metal, dense wood, and other obstacles resistant to slicing) without breakage.

Biasing mechanism 414 includes intermediate plates 416 and 418 rigidly coupled to holding arm 404, flange 420 rigidly coupled to mounting plate 412, and a threaded screw 422 slidingly positioned through holes (not shown) within flange 420 and intermediate plate 416. Threaded screw 422 includes a washer 424 for maintaining the threaded screw in frictional engagement with intermediate plate 416 and a stopping plate 426 (kept in place on threaded screw via adjustment nut 428) for maintaining a biasing member 430, e.g., compression spring, in frictional engagement between stopping plate 426 and flange 420. The foregoing provides for the disk blade to be biased along a predefined direction with respect to the frame. In operation, contact of disk blade 402 with a stalk of corn, the ground, debris, or other obstacles causes holding arm 404 to rotate about pivot 406 along direction 432, thereby causing intermediate plate 416 to retract threaded screw 422 along a direction perpendicular to flange 420. Retraction of threaded screw 422 causes stopping plate 426 to compress compression spring 428 against flange 420 to produce a biasing force about pivot 406 toward the ground in a direction opposite to direction 432.

Although biasing mechanism 414 of FIGS. 4A and 4B employs a compression spring 430 for biasing disk blade 402 against the ground, it should be appreciated that other means may be employed for biasing disk blade 402. For example, biasing mechanism 414 may include a torsional spring (not shown) positioned about pivot 406 for providing a torsional biasing force against holding arm 404 with respect to mounting plate 420. Alternatively, in accordance with an exemplary embodiment of the present invention, a separate compression spring (not shown) may be mounted between mounting bar 402 and holding arm 404 for producing the biasing force. It should be appreciated, however, that the various exemplary embodiments of the present invention are not intended to be limited to any particular type of biasing mechanism, and that the full scope of the invention contemplates various additional manners for producing a force to bias disk blade 402 against the ground while in use.

The mounting bar 402, holding arm 404, and mounting plate 412, along with other associated parts collectively form a support structure of the stalk splitter for mounting the stalk splitter to the frame of the header. The disk blade is preferably vertically oriented and coupled to the support structure. However, the disk blade can alternatively be substantially vertically oriented, e.g., angled with respect to the horizontal ground surface. Further, the vertically oriented disk blade 402 is rotationally coupled to the support structure. The support structure along includes at least one biasing member to bias the disk blade along a predefined direction with respect to the frame, and is pivotably mounted the frame of the header. As such, the support structure is configured to urge the disk blade along a predefined direction with respect to the frame of the header.

Figure 5A:
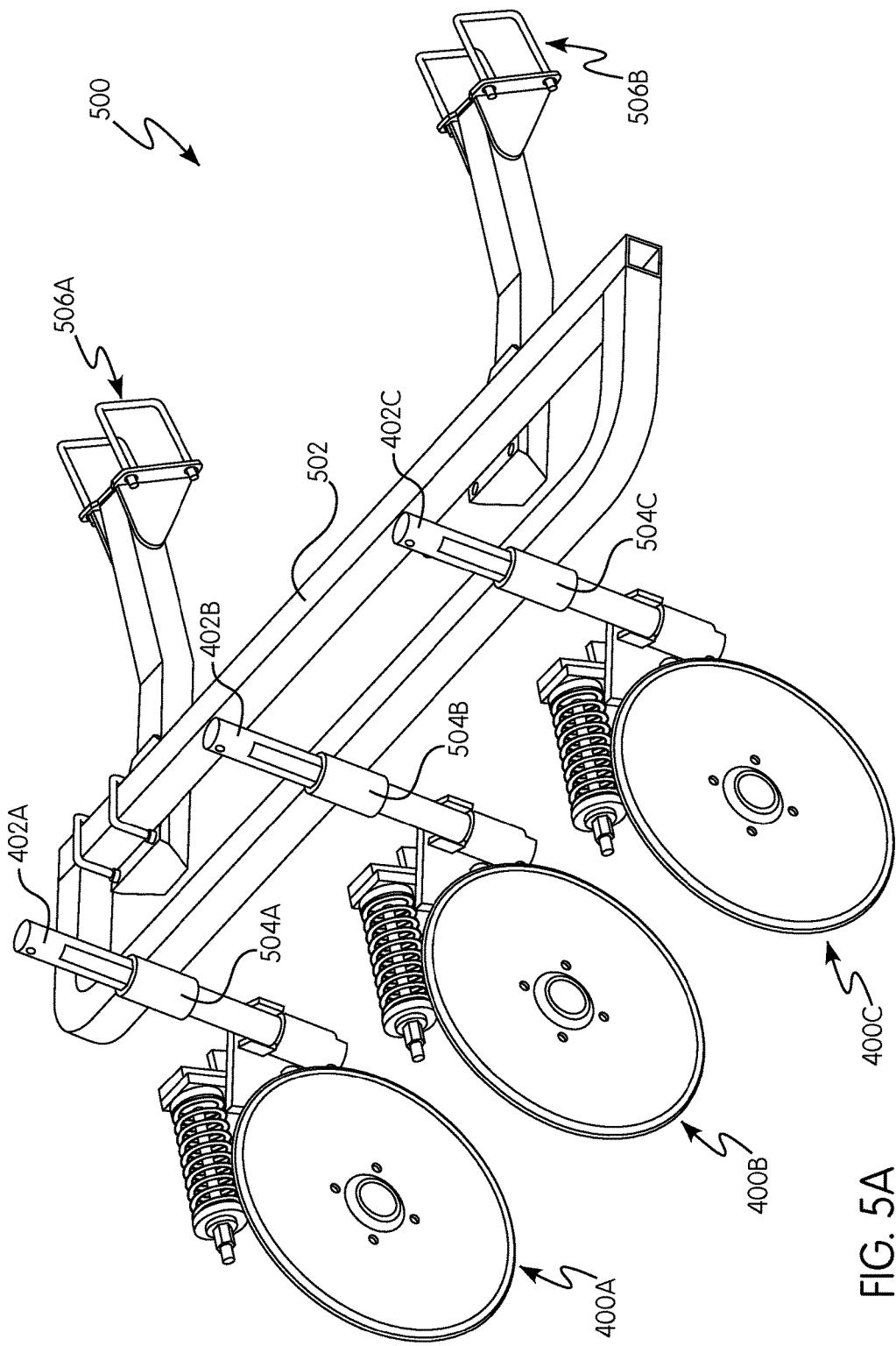
FIG. 5A is a perspective view of a stalk splitter assembly for a harvester in accordance with an exemplary embodiment of the present invention.
Figure 5B:
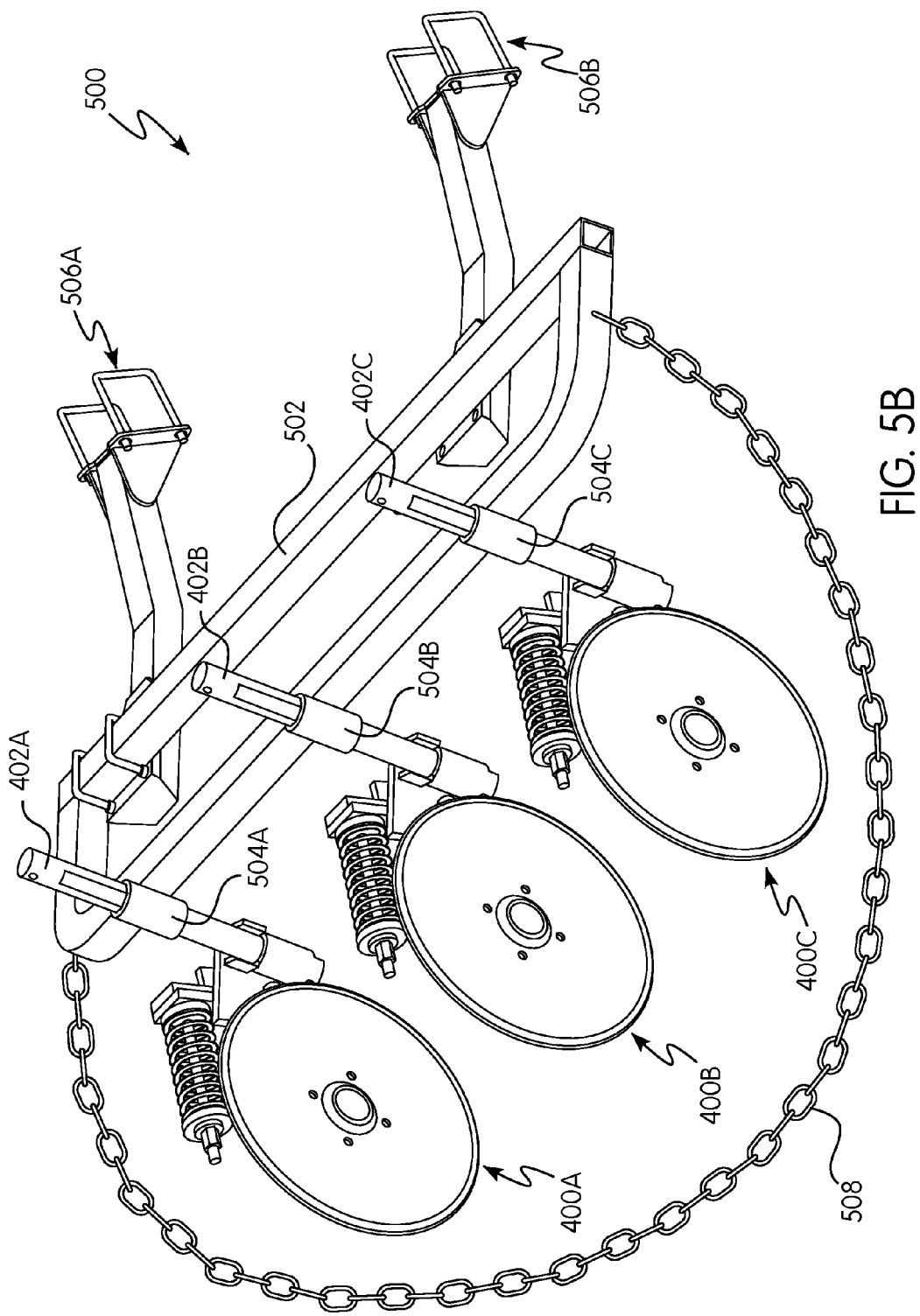
FIG. 5B is a perspective view of a stalk splitter assembly for a harvester in accordance with another exemplary embodiment of the present invention.

Referring now to FIG. 5, there is seen a stalk splitter assembly 500 in accordance with an exemplary embodiment of the present invention. Stalk splitter assembly 500 includes three stalk splitters 400A, 400B, and 400C coupled to intermediate frame member 402 via respective mounting pipes 504A, 504B, 504C. Intermediate frame member 502 is configured to couple to the frame of a corn header via mounting points 506A and 506B such that each of stalk splitters 400A, 400B and 400C is positioned inline and behind an associated row unit for splitting stalks of corn after the stalks are processed by the row units. In an alternative exemplary embodiment in accordance with the present invention, stalk splitters 400A, 400B, and 400C are coupled directly to the frame of the corn header without need for intermediate frame member 502.

Mounting pipes 504A, 504B, 504C receive respective mounting bars 402A, 402B, and 402C in various selectable positions, thereby permitting the vertical heights of stalk splitters 400A, 400B and 400C to be selectively adjusted to accommodate different sized headers. In one alternative exemplary embodiment, mounting pipes 504A, 504B, 504C also permit stalk splitters 400A, 400B, and 400C to pivot about mounting bars 402A, 402B, and 402C to permit the stalk splitters to better follow rows of corn, such as when rows of corn change direction in a field.

In another alternative exemplary embodiment, a looped chain 508 is coupled to intermediate frame member 502 and dragged behind the stalk splitters to knock down or otherwise flatten stalks of corn after they are split by stalk splitters 400A, 400B, and 400C. In other words, the looped chain 508 is mounted to the frame and extends behind the splitting mechanism, and is configured to knock over stalk after the splitting mechanism slices the stalk along its longitudinal axis.

As shown in FIG. 5A, stalk splitter assembly 500 is intended to be used with a corn header having three row units. However, it should be appreciated that stalk splitter assembly 500 may be sized and configured to include any number of stalk splitters to match corn headers having a commensurate number of row units. For example, stalk splitter assembly 500 may be sized and configured to include eight stalk splitters to accommodate corn headers with eight row units. Alternatively, multiple stalk splitter assemblies 500 may be mounted to a corn header in modular fashion to accommodate a certain number of row units. For example, four modular stalk splitter assemblies, each with two stalk splitters, may be mounted to a corn header having eight row units.

Referring now to FIG. 6, there is shown a stalk splitter and stomping shoe assembly 600 in accordance with an exemplary embodiment of the present invention. The assembly includes e.g., three stomping shoes 200A, 200B, and 200C coupled to intermediate frame member 602 via respective mounting brackets 202A, 202B, and 202C, and three stalk splitters 400A, 400B, and 400C coupled to intermediate frame member 602 via respective mounting pipes 604A, 604B, and 604C. In an alternative exemplary embodiment, stomping shoes 200A, 200B, and 200C and stalk splitters 400A, 400B, and 400C are coupled directly to the frame of the corn header without need for intermediate frame member 602.

Figure 6A:
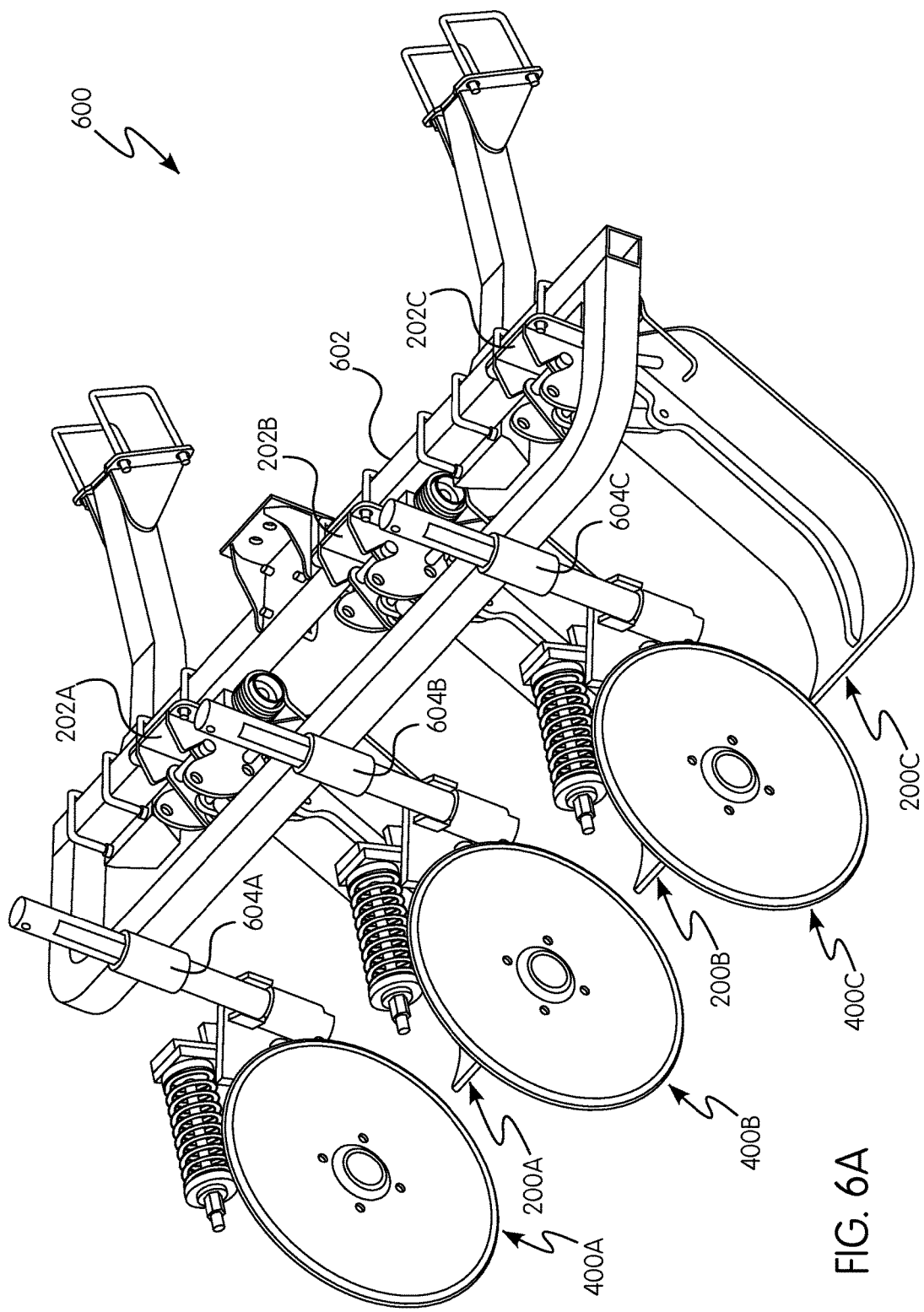
FIG. 6A is a perspective view of a stalk splitter and stomping shoe assembly for a harvester in accordance with an exemplary embodiment of the present invention.

As shown in FIG. 6A, stalk splitters 400A, 400B, and 400C are positioned inline and behind respective stomping shoes 200A, 200B, and 200C and row units (not shown) to split stalks of corn after they are processed by the row units and flattened by the stomping shoes. In other words, the stalk splitter is mounted to the frame behind the stomping shoe. In another exemplary embodiment, stomping shoes 200A, 200B, and 200C include a plurality of structures on their faces that guide stalks of corn along longitudinal centerlines of the faces while the stalks are flattened. In this manner, stalks of corn remain aligned with stalk splitters 400A, 400B, and 400C for splitting the stalks of corn longitudinally.

FIG. 6B illustrates another exemplary embodiment in accordance with the present invention having a stalk splitter and stomping shoe assembly 600'. The assembly 600' includes stomping shoes 200A, 200B, and 200C mounted behind stalk splitters 400A, 400B, and 400C (FIG. 6B) to flatten stalks of corn after they are split.

The stalk splitter and stomping shoe assembly 600 is intended to be used with a corn header having three row units. However, it should be appreciated that the assembly 600 may be sized and configured to include any number of stomping shoes and stalk splitters to match corn headers having a commensurate number of row units. Alternatively, multiple assemblies 600 may be mounted to a corn header in modular fashion to accommodate a certain number of row units.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A header for a combine harvester comprising:
   a frame configured to mount to a forward end of the combine harvester;
   at least one row unit mounted to the frame and configured to receive and process crop stalks;
   a stomping shoe mounted to the frame behind the row unit, the stomping shoe configured to flatten the stalks; and
   a stalk splitter mounted to the frame behind the row unit, the stalk splitter including:
   a support structure mounted to the frame, the support structure having:
   a mounting bar mounted to the frame,
   a holding arm pivotably mounted to the mounting bar and connected to a disk blade, and
   a mounting arm assembly pivotably mounted to the mounting bar and connected to the holding arm, the mounting arm assembly having a biasing member adjacent a lateral side of the disk blade biasing the disk blade.

2. The header of claim 1, wherein the stalk splitter is mounted to the frame behind the stomping shoe.

3. The header of claim 1, wherein the stomping shoe includes an elongated concavity extending along a central longitudinal centerline of the stomping shoe for guiding the stalk along a predefined path defined by the elongated concavity.

4. The header of claim 1, wherein the stomping shoe includes a face for flattening the stalks, the face including a plurality of structures configured to guide each stalk along a predefined path on the face.

5. The header of claim 4, wherein the predefined path extends along a longitudinal centerline of the face.

6. The header of claim 4, wherein the plurality of structures include at least one of ridges, recesses, fins, welded beads and welded key stock.

7. The header of claim 4, wherein the plurality of structures include two opposed rows of chevron-shaped ridges arranged on opposite sides of a longitudinal centerline of the face.

8. The header of claim 4, wherein the face of the stomping shoe further includes a plastic cover, and the plurality of structures are disposed on the plastic cover.

9. The header of claim 1, wherein the disk blade is biased along a predefined direction with respect to the frame.

10. The header of claim 1, wherein the mounting arm assembly includes:
    a first plate rigidly connected to the mounting bar, and
    a second plate rigidly connected to the holding arm and movable relative to the first plate, and
    wherein the biasing member biases the mounting arm assembly.

11. A header for use with a combine harvester comprising:
    a frame configured to mount to a forward end of the combine harvester;
    at least one row unit mounted to the frame and configured to receive crop stalks; and
    a stomping shoe mounted to the frame behind the row unit and configured to flatten a stalk after the stalk is received by the row unit and including an elongated concavity extending along a central longitudinal centerline of the stomping shoe for guiding the stalk along a predefined path defined by the elongated concavity, the stomping shoe including a face having a plurality of structures disposed thereon, wherein each of the plurality of structures is configured to guide the stalk along the predefined path on the face while the stalk is being flattened.

12. The header of claim 11, wherein the plurality of structures include at least one of ridges, recesses, fins, welded beads, and welded key stock.

13. The header of claim 11, wherein the plurality of structures include two opposed rows of chevron-shaped ridges arranged on opposite sides of a longitudinal centerline of the face.

14. A header for use with a combine harvester comprising:
    a frame configured to mount to a forward end of the combine harvester;
    at least one row unit mounted to the frame and configured to receive a stalk; and
    a splitting mechanism mounted to the frame behind the row unit, the splitting mechanism including:
    a support structure mounted to the frame, the support structure having:
    a mounting bar mounted to the frame,
    a holding arm pivotably mounted to the mounting bar and connected to a disk blade, and a mounting arm assembly pivotably mounted to the mounting bar and connected to the holding arm, the mounting arm assembly having:
    a first plate rigidly connected to the mounting bar, and
    a second plate rigidly connected to the holding arm and movable relative to the first plate, and
a biasing member biasing the mounting arm assembly.

15. The header of claim 14, further comprising a looped chain mounted to the frame and extending behind the splitting mechanism, the looped chain configured to knock over the stalk after the splitting mechanism slices the stalk along its longitudinal axis.

16. The header of claim 14, wherein the splitting mechanism further includes a drive mechanism for rotating the disk blade.

17. The header of claim 14, wherein the biasing member biases against the first plate.

18. The header of claim 14, wherein the first plate is between the second plate and biasing member.

19. The header of claim 14, wherein the biasing member biases the second plate towards the first plate.

\* \* \* \* \*